July 8, 1924.
F. SCHMOLL
LAWN MOWER SHARPENER
Filed March 14, 1923
1,500,898
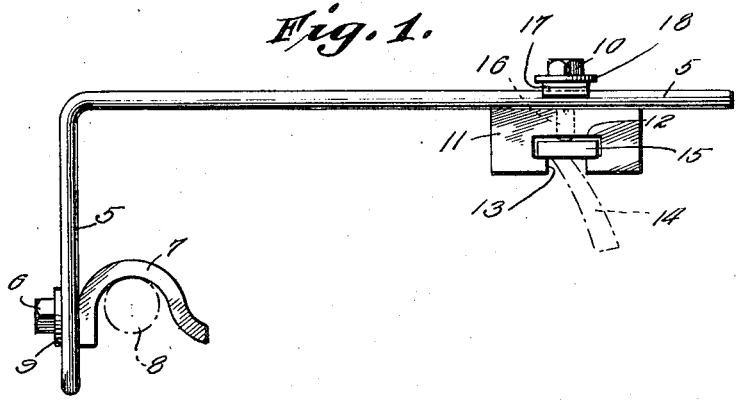
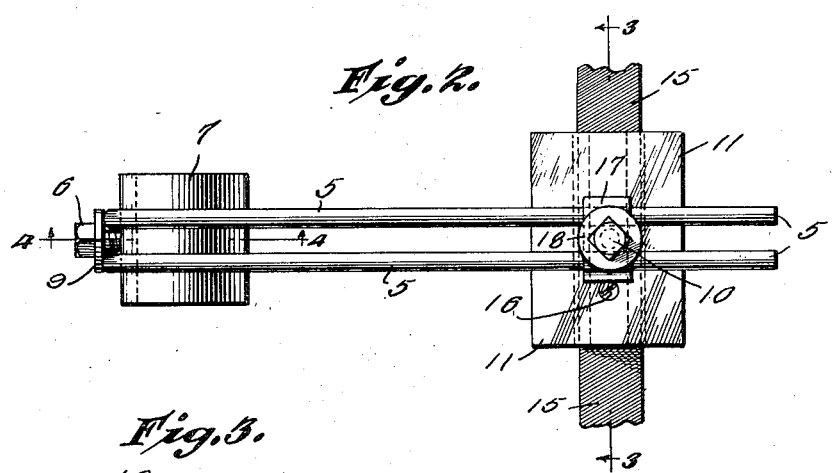
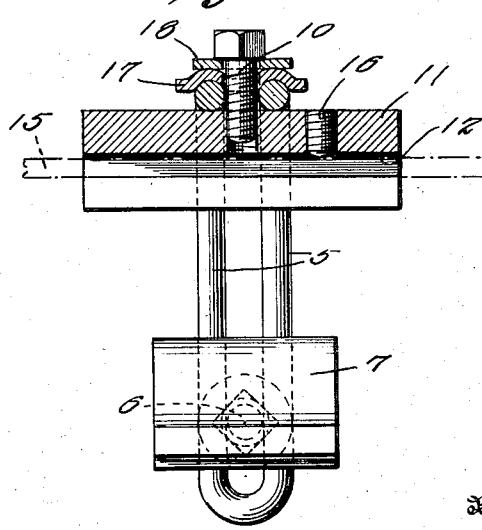
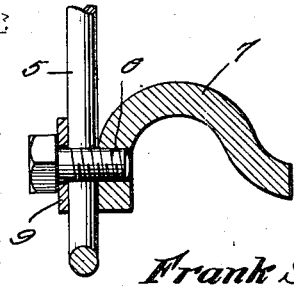
Inventor
Frank Schmoll
By Norman T. Whitaker
his Attorney Patented July 8, 1924.

1,500,898

UNITED STATES PATENT OFFICE.

FRANK SCHMOLL, OF CLEAR LAKE, IOWA.

LAWN-MOWER SHARPENER.

Application filed March 14, 1923. Serial No. 625,030.

*To all whom it may concern:*

Be it known that I, FRANK SCHMOLL, a citizen of the United States, and a resident of Clear Lake, in the county of Cerro Gordo and State of Iowa, have invented a new and useful Improvement in a Lawn-Mower Sharpener, of which the following is a specification.

My invention relates to lawn mower sharpeners and its principal object is to provide a device for attachment to a lawn mower to support a file in a position to engage the cutting edges of the mower blades to file or sharpen the latter.

A further object of the invention is to provide an attachment for lawn mowers for supporting and guiding a file across the cutting edges of the mower blades.

It is also an object of the invention to provide a device which may be readily supported in operative position on a lawn mower and to hold a file in a position to engage the cutting edges of the mower blades.

Another object of the invention is to provide a device of this character, which embodies adjustable means for detachment to a lawn mower and a longitudinal adjustable file holder adapted to be moved transversely across the cutting edges, of the mower blades.

With the preceding and other objects and advantages in mind, the invention consists in the novel combination of elements, construction and arrangement of parts to be set forth in detail, claimed and illustrated in the accompanying drawings, wherein:

Figure 1 is a side elevation of the attachment associated with parts of the lawn mower, the lawn mower parts being shown in dotted and dashed lines;

Fig. 2 is a top plane view of the device;

Fig. 3 is a vertical sectional view taken on line 3—3 of Fig. 2, and

Fig. 4 is a fragmentary detail view, taken on line 4—4 of Fig. 2.

Referring to the drawing in detail, wherein corresponding characters of reference designate corresponding parts throughout the several views, the numeral 5 designates a length of relatively heavy wire which bent intermediate its ends in U shaped formation thence bent adjacent to one end to afford an L shaped bracket. Vertically adjusted in the vertical L shaped bracket is a threaded bolt 6 threadedly engaged in a clip or arcuate plate 7 adapted to rest upon one of the lawn mower bearings or shaft designated at 8. A washer 9 is interposed between the head of the bolt 6 and the vertical leg of the bracket 5 to afford an even bearing surface for the bolt head.

Slidably mounted in the horizontal leg of the bracket 5 is a bolt 10 connected with a block or carriage 11, the latter being provided with a longitudinal groove 12 in its under face to communicate with the longitudinal slot 13 through which the lawn mower cutter blades 14 are adapted to project. A file 15 is received in the groove 12 and is retained against longitudinal movement by a set screw 16 carried by the block or carriage 11. A corrugated plate 17 is received on the bolt 10 between the head thereof and the horizontal leg of the bracket and embraces the latter, as shown in Fig. 3.

A washer 18 is interposed between the head of the bolt 10 and the outer face of the bracket. With the parts assembled as shown in the drawing, the operation of the device is as follows: The clip of plate 7 being engaged with the shaft or one of the bearings of the lawn mower and the block or carriage 11 being disposed above the cutter plate 14 with the upper edge of the latter projecting into the slot 13 with the cutting edge thereof engaging the file 15. The operator then grasps the ends of the file 15 and moves the same with the carriage, transversely back and forth across the cutting edge of the cutter blade to file or sharpen the edges thereof. In connection with the slot 13, it will be stated that this slot is sufficient width as to permit the carriage to move a sufficient distance to permit the file to pass over the entire face of the cutting edges of the cutter blade.

It is to be understood that the form of my invention, herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A device for attachment to a lawn mower including a length of rigid wire bent in U shaped formation and then bent intermediate its ends to provide an L shaped bracket, means for supporting one leg of the bracket on a lawn mower, a file holder slidably mounted on the other leg of the bracket and having a slot in its under face to receive the cutting edges of the mower blade, and a sharpening element mounted in the slot engaging the cutter edge of the cutter blade.

2. A device for attachment to a lawn mower comprising a length of rigid wire bent in U shaped formation and thus bent to provide a bracket having a longitudinal leg and a vertical leg, a clip adjustably carried by the vertical leg and adapted to embrace one of the lawn mower parts to support the bracket, a carriage reciprocable in the horizontal leg of the bracket and having a slot for the reception of the cutter blade and a sharpening element disposed within the carriage and contacting with the cutting edge of the cutter blade.

3. A lawn mower attachment comprising a bracket to be supported on the lawn mower, a carriage reciprocable horizontally on the bracket and adjacent the cutting edges of the cutter blade, the carriage being provided with a longitudinal groove on its under face and also a longitudinal slot communicating with the groove and into which the cutter blade projects, and a sharpening member arranged in the groove.

FRANK SCHMOLL.